United States Patent
Andriantsiferana et al.

(10) Patent No.: US 7,756,040 B1
(45) Date of Patent: Jul. 13, 2010

(54) SYSTEM AND METHOD FOR RELAYING INFORMATION IN ORDER TO ENABLE SERVICES IN A NETWORK ENVIRONMENT

(75) Inventors: Laurent H. Andriantsiferana, Cupertino, CA (US); Jayaraman R. Iyer, Sunnyvale, CA (US); Biswaranjan Panda, Sunnyvale, CA (US); Ashish A. Chandwadkar, Morrisville, NC (US); Louis F. Menditto, Raleigh, NC (US); Chris O'Rourke, Apex, NC (US)

(73) Assignee: Cisco Technology, Inc., San Jose, CA (US)

( * ) Notice: Subject to any disclaimer, the term of this patent is extended or adjusted under 35 U.S.C. 154(b) by 1197 days.

(21) Appl. No.: 10/680,957

(22) Filed: Oct. 8, 2003

(51) Int. Cl.
*G08C 15/00* (2006.01)

(52) U.S. Cl. .............. 370/236; 370/241.1; 370/329

(58) Field of Classification Search ............. 370/236, 370/241.1, 329
See application file for complete search history.

(56) References Cited

U.S. PATENT DOCUMENTS

| | | | |
|---|---|---|---|
| 5,774,660 A | 6/1998 | Brendel et al. | 395/200.31 |
| 5,951,694 A | 9/1999 | Choquier et al. | 714/15 |
| 6,006,264 A | 12/1999 | Colby et al. | 709/226 |
| 6,016,305 A | 1/2000 | Borst et al. | 370/234 |
| 6,128,642 A | 10/2000 | Doraswamy et al. | 709/201 |
| 6,128,657 A | 10/2000 | Okanoya et al. | 709/224 |
| 6,137,777 A | 10/2000 | Vaid et al. | 370/230 |
| 6,185,619 B1 | 2/2001 | Joffe et al. | 709/229 |
| 6,201,962 B1 | 3/2001 | Sturniolo et al. | 455/432 |
| 6,230,012 B1 | 5/2001 | Willkie et al. | 455/435 |
| 6,249,801 B1 | 6/2001 | Zisapel et al. | 709/105 |
| 6,263,368 B1 | 7/2001 | Martin | 709/224 |
| 6,298,383 B1 | 10/2001 | Gutman et al. | 709/229 |
| 6,327,622 B1 | 12/2001 | Jindal et al. | 709/228 |
| 6,330,602 B1 | 12/2001 | Law et al. | 709/224 |
| 6,377,571 B1 | 4/2002 | Tai | 370/355 |
| 6,377,982 B1 | 4/2002 | Rai et al. | 709/217 |
| 6,393,458 B1 | 5/2002 | Gigliotti et al. | 709/203 |
| 6,393,482 B1 | 5/2002 | Rai et al. | 709/225 |
| 6,400,722 B1 | 6/2002 | Chuah et al. | 370/401 |
| 6,414,950 B1 | 7/2002 | Rai et al. | 370/338 |
| 6,421,714 B1 | 7/2002 | Rai et al. | 709/217 |
| 6,434,618 B1 | 8/2002 | Cohen et al. | 709/228 |
| 6,442,165 B1 | 8/2002 | Sitaraman et al. | 370/395.4 |
| 6,466,571 B1 | 10/2002 | Dynarski et al. | 370/352 |
| 6,473,802 B2 | 10/2002 | Masters | 709/229 |
| 6,484,143 B1 | 11/2002 | Swildens et al. | 705/1 |

(Continued)

OTHER PUBLICATIONS

Information Sciences Institute, "Internet Protocol, DARPA Internet Program Protocol Specification," Univ. of Southern Califorinia, 49 pgs, Sep. 1981.

(Continued)

*Primary Examiner*—Jason E Mattis
(74) *Attorney, Agent, or Firm*—Baker Botts L.L.P.

(57) ABSTRACT

A method for relaying information in a network environment is provided that includes establishing primary and secondary packet data protocol (PDP) links on behalf of an end user and communicating traffic pattern information associated with the primary and secondary PDP links to a client services packet gateway (CSPG), the traffic pattern information providing data associated with how traffic flows propagating via each of the primary and secondary PDP links are to be treated in a network.

21 Claims, 2 Drawing Sheets

U.S. PATENT DOCUMENTS

| | | | |
|---|---|---|---|
| 6,512,754 B2 | 1/2003 | Feder et al. | 370/338 |
| 6,529,501 B1 | 3/2003 | Zhao et al. | 370/353 |
| 7,155,526 B2* | 12/2006 | Chaudhary et al. | 709/229 |
| 7,298,751 B1* | 11/2007 | Baker et al. | 370/401 |
| 7,539,180 B2* | 5/2009 | Lundstrom | 370/356 |
| 2002/0191597 A1* | 12/2002 | Lundstrom | 370/356 |
| 2003/0221016 A1* | 11/2003 | Jouppi et al. | 709/245 |
| 2004/0037269 A1* | 2/2004 | Lundin | 370/352 |
| 2008/0096523 A1* | 4/2008 | Lundin et al. | 455/406 |

OTHER PUBLICATIONS

S. Deering, "Host Extensions for IP Multicasting," Stanford University, 17 pgs, Aug. 1989.

* cited by examiner

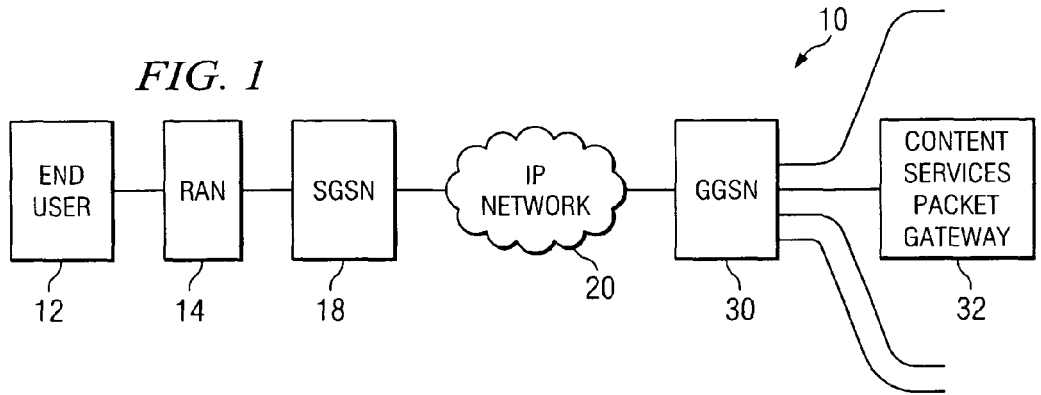
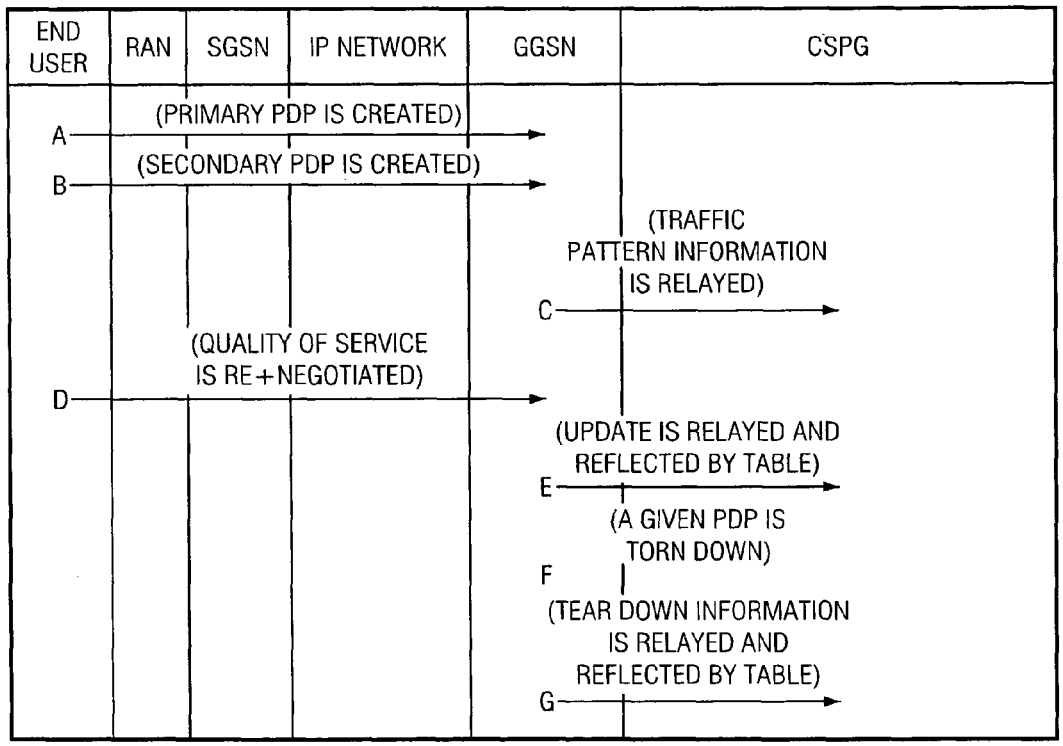

FIG. 2

CLIENT SERVICES PACKET GATEWAY 32

TABLE 40

| GGSN NUMBER | PRIMARY PDPs | SECONDARY PDPs | IP ADDRESS | POLICY/ PROFILE | QUALITY OF SERVICE | PROTOCOL | SOURCE/ DESTINATION PORTS | SOURCE/ DESTINATION IP | MISC. |
|---|---|---|---|---|---|---|---|---|---|
| 1 | | | | | | | | | |
| 2 | | | | | | | | | |
| 3 | | | | | | | | | |
| 4 | | | | | | | | | |
| ... | | | | | | | | | |

SYSTEM AND METHOD FOR RELAYING INFORMATION IN ORDER TO ENABLE SERVICES IN A NETWORK ENVIRONMENT

TECHNICAL FIELD OF THE INVENTION

This invention relates in general to the field of communications and, more particularly, to a system and method for relaying information in order to enable services in a network environment.

BACKGROUND OF THE INVENTION

Networking services have become increasingly important in today's society. One feature of networking services relates to client or source awareness. Certain services, functions, or capabilities may be provided to a group of end users or to clients based on a corresponding source profile or policy. Devices or components within a network must generally be able to identify such a profile or policy before offering selected enhanced services, functions, or capabilities to a targeted group of end users. Accordingly, sufficient information must be made available at various networking devices in order to allow for an accurate identification of a client or a source.

In some environments, the source identification, policy, or service level may be unknown, hidden, or otherwise transformed such that it is hidden from the perspective of the destination point that receives a message. This translates into a device or a component that receives the message being generally unable to determine a point of origin associated with the data request. This blindness or shielding creates a problem in attempting to offer services or capabilities to a select group of users based on their source profile or policy. In some instances, the inability to determine the origination of a data flow precludes a device or a component from offering services based on the identity of an end user. Accordingly, the ability to provide an awareness feature to interested network equipment (without sacrificing significant amounts of time or bandwidth) presents a significant challenge to network administrators, component manufacturers, and system designers.

SUMMARY OF THE INVENTION

From the foregoing, it may be appreciated by those skilled in the art that a need has arisen for an improved communications approach that provides an awareness function for interested network equipment. In accordance with one embodiment of the present invention, a system and a method for relaying information in order to enable services in a network environment are provided that greatly reduce disadvantages and problems associated with conventional communications techniques.

According to one embodiment of the present invention, there is provided a method for offering differentiated services in a communication system that includes establishing primary and secondary packet data protocol (PDP) links on behalf of an end user and communicating traffic pattern information associated with the primary and secondary PDP links to a client services packet gateway (CSPG), the traffic pattern information providing data associated with how traffic flows propagating via each of the primary and secondary PDP links are to be treated in a network.

Certain embodiments of the present invention may provide a number of technical advantages. For example, according to one embodiment of the present invention, a communications approach is provided that allows a device or a component within a network environment to identify a session belonging to a given end user. This allows receiving devices and components within the network environment to provide any number of services to a group of end users. Additionally, this identification function allows network equipment to offer networking features or capabilities at varying quality of service levels. Thus, an increased granularity is provided by such a communications configuration, allowing for greater specificity in terms of the treatment of data flows or packets. Moreover, such granularity may be achieved without inhibiting bandwidth parameters, sacrificing time, or restricting processing speeds. This is a result of the ability of the GGSN to simply relay pertinent information to network equipment when a given PDP is created, updated, or torn down. Certain embodiments of the present invention may enjoy some, all, or none of these advantages. Other technical advantages may be readily apparent to one skilled in the art from the following figures, description, and claims.

BRIEF DESCRIPTION OF THE DRAWINGS

To provide a more complete understanding of the present invention and features and advantages thereof, reference is made to the following description, taken in conjunction with the accompanying figures, wherein like reference numerals represent like parts, in which:

FIG. 1 is a simplified block diagram of a communications system for relaying information in order to enable services in a network environment in accordance with one embodiment of the present invention;

FIG. 2 is a simplified block diagram of a table for storing information in the communication system; and FIG. 3 is a simplified timing diagram illustrating one example interaction between multiple elements included in the communication system.

DETAILED DESCRIPTION OF EXAMPLE EMBODIMENTS OF THE INVENTION

FIG. 1 is a simplified block diagram of a communication system 10 for relaying information in a network environment. Communication system 10 includes an end user 12, a radio access network (RAN) 14, a serving general packet radio service (GPRS) support node (SGSN) 18, and an internet protocol (IP) network 20. Additionally, communication system 10 includes a gateway GPRS support nodes (GGSN) 30 and may also include a client services packet gateway (CSPG) 32. FIG. 1 may be generally configured or arranged to represent a 2.5 G communication architecture applicable to a Global System for Mobile (GSM) environment in accordance with a particular embodiment of the present invention. However, the 2.5G architecture is offered for purposes of example only and may alternatively be substituted with any suitable networking protocol or arrangement that provides a communicative platform for communication system 10. For example, communication system 10 may cooperate with any version of a GPRS tunneling protocol (GTP) that could benefit from an awareness capability being provided to any network element. This may be inclusive of first generation, 2G, and 3G architectures that provide features and services for any end user 12. Moreover, communication system 10 could be applied to any access network/protocol that allows end user 12 to create sub-connections, which specify differential treatment for packets in those connections. Furthermore, the relaying of such information into one or more CSPG devices could be implemented in any such network/access technology.

In accordance with the teachings of the present invention, communication system 10 provides secondary PDP awareness and capabilities to CSPG 32. GGSN 30 can generally provide network access to end user 12 (e.g. via a mobile station) by terminating GTP tunnels initiated by SGSN 18. The GTP protocol may allow mobile stations to open multiple PDPs within these GTP tunnels. Secondary PDPs are sub-tunnels intended to be used to provide differentiated QoS for traffic flowing through them. When opening a secondary PDP, a mobile station can specify a traffic flow template (TFT) that defines the traffic pattern, which in turn governs the treatment of traffic that the mobile station will send through this PDP. The TFT may define, for example, the L3-L4 information (IP address and ports) as well as a desired QoS for this PDP.

The TFT information (or any significant portion thereof) may be stored in GGSN 30 to offer per-PDP QoS to the mobile station (i.e. end user 12). GGSN 30 may be configured to relay the TFT information into backend flows (e.g. RADIUS, DIAMETER, and GTP') to other interested network elements. TFT information element may consist of source/destination IP addresses, source/destination ports, a protocol identifier, an IPSec security parameter index, a type of service/traffic class, etc. This allows other network elements that are gathering information (via RADIUS proxy or a GTP' interface to GGSN 30) to properly classify and provide differentiated services to traffic on each secondary PDP.

An example of such a service to be provided is differentiated billing. If end user 12 opens two PDPs, one for basic Internet connectivity and the other with a higher QoS for a voice application, downstream service gateways could bill the voice application at a higher rate. This could be accomplished by matching user traffic to a TFT-defined L4 profile learned by an interested service gateway via RADIUS or GTP'. Thus, GGSN 30 is equipped to relay the TFT traffic profile data (i.e. traffic pattern information) associated with secondary PDPs through its control path interfaces (GTP', RADIUS, etc). This enables interested service gateways in the control path (e.g. CSPG 32) to deliver per-PDP differentiated services. GGSN 30 adds TFT profile info to the GTP' and RADIUS interfaces. CSPG 32 could then begin parsing this info and applying differentiated services per-PDP.

Communication system 10 addresses an awareness issue caused by a host of devices that have been inserted behind a given GGSN in order to deliver a variety of services, functions, and features to users coming to that GGSN. End user 12 could have multiple tunnels (i.e. primary and secondary PDPs) within a GTP tunnel. Each sub-tunnel could carry traffic for end user 12 of a specified application and receive a specified quality of service provided by the GGSN. Consider another example where a mobile station is engaged in running a web browser and a voice-over IP application for telephony (simultaneously). Note that the telephony application has less tolerance for latency and delay because of the nature of such an application, and the mobile station may open a second PDP having a much higher quality of service for the voice traffic than for the hyper-text transfer protocol (HTTP) traffic. GGSN 30 is capable of assigning or applying the correct quality of service. GGSN 30 may perform this by setting a selected quality of service bit that would give a corresponding PDP a higher quality of service (e.g. giving a packet a higher priority in a corresponding queue) or any other enhancement that would achieve a higher quality of service.

A problem may exist, without the use of communication system 10, because CSPG 32 is not aware of which PDP corresponds to a given packet or flow. Due to this lack of awareness, CSPG 32 would be unable to deliver an appropriate quality of service to individual PDPs. For example, a service provided may merit a higher billing rate for information propagating through a secondary PDP. This may be based on a quality of service requested by end user 12. If a billing entity (i.e. CSPG 32) is a separate entity that lacks an awareness of this characteristic, it is unable to deliver the proper quality of service and bill it accordingly. Thus, different PDP contexts and different quality of service levels cannot be accommodated.

Communication system 10 addresses this issue by allowing GGSN 30 to relay traffic pattern information to other network elements (e.g. CSPG 32) at any appropriate time (e.g. when the PDP is created, updated, or torn down). A backend control protocol (e.g. RADIUS) is leveraged to deliver this information to network equipment that may seek to know or to utilize this information. Thus, when a secondary PDP is created, GGSN may send a message (e.g. a RADIUS accounting start message) to an interested piece of network equipment. The creation, updating, or tearing down of a PDP can trigger relaying of the message. The message may include traffic pattern information (e.g. a traffic flow classifier) that identifies the flows, which correspond to each PDP and the QoS for that PDP. Once the message is received, a given service element may proxy this information or create and store their own mappings to identify traffic and map the traffic to different policies. Once this procedure is completed, each service element is capable of delivering per-PDP services (e.g. process scheduling, billing configurations, etc.).

End user 12 is a client or a customer wishing to initiate a communication in communication system 10 via IP network 20. End user 12 may be inclusive of devices used to initiate a communication, such as a computer, a personal digital assistant (PDA), a laptop or an electronic notebook, a telephone, a mobile station, or any other device, component, element, or object capable of initiating voice or data exchanges within communication system 10. End user 12 may also be inclusive of a suitable interface to the human user, such as a microphone, a display, a keyboard, or other terminal equipment (such as for example an interface to a personal computer or to a facsimile machine in cases where end user 12 is used as a modem). End user 12 may also be any device that seeks to initiate a communication on behalf of another entity or element, such as a program, a database, or any other component, device, element, or object capable of initiating a voice or a data exchange within communication system 10. Data, as used herein in this document, refers to any type of numeric, voice, video, audio-visual, or script data, or any type of source or object code, or any other suitable information in any appropriate format that may be communicated from one point to another.

RAN 14 is a communications interface between end user 12 and SGSN 18. RAN 14 may comprise a base transceiver station and a base station controller. The communications interface provided by RAN 14 offers connectivity and allows data to be exchanged between end user 12 and any number of selected elements within communication system 10. RAN 14 facilitates the delivery of a request packet generated by end user 12 and the reception of information sought by end user 12. RAN 14 is only one example of a communications interface between end user 12 and SGSN 18. Other types of communications interfaces may be used for a desired network design based on particular needs.

IP network 20 represents a series of points or nodes of interconnected communication paths for receiving and transmitting packets of information that propagate through communication system 10. IP network 20 offers a communicative interface between end user 12 and GGSN 30 and may be any local area network (LAN), wireless local area network (WLAN), metropolitan area network (MAN), wide area network (WAN), virtual private network (VPN), or any other appropriate architecture or system that facilitates communications in a network environment. IP network 20 implements a user datagram protocol (UDP)/internet protocol (UDP/IP) communication language protocol in a particular embodiment of the present invention. However, IP network 20 may alternatively implement any other suitable communication protocol for transmitting and receiving data or information within communication system 10.

SGSN 18 and GGSN 30 are network elements that cooperate in order to facilitate a communication session involving end user 12. GGSN 30 is a communication or network node that may be working in conjunction with multiple SGSNs 18 to provide a communications medium in a GPRS service network environment. GGSN 30 may be inclusive of a walled garden used to control user access to web content or services. GPRS represents a packet-based data bearer service for communication services that may be delivered as a network overlay for any type of suitable network configuration or platform. GPRS generally applies packet-radio and packet switching principles to transfer data packets in an efficient way between GSM elements or units and external packet data networks. GPRS may support multiple internet communication protocols and may enable existing IP, X.25, frame relay, or any other suitable applications or platforms to operate over GSM connections.

In a particular embodiment of the present invention, GGSN 30 includes software that is operable to identify and relay traffic pattern information to any interested piece of network equipment or to any appropriate network location. Alternatively, this identification and relaying function may be provided by any suitable hardware, component, device, application specific integrated circuit (ASIC), processor, algorithm, element or object that is operable to perform such operations. Traffic pattern information may be inclusive of policy information, profile data, or other information relating to elements such as an IP destination address, an IP source address, a protocol type, a source port, a destination port, a quality of service, a security parameter, or any other appropriate data where appropriate and based on particular needs. This information operates to provide a secondary PDP source awareness to interested network equipment. Note that such a relay functionality may be provided external to GGSN 30, allowing awareness to be achieved for interested components in the network.

CSPG 32 is a client-aware device that may provide or offer some service or feature to end user 12. Such services may be based on an effective mapping between a source IP address of a given request packet and a user profile. Client-aware devices may key off the source IP address in providing services to an end user. There are a number of reasons why a device or a component would want to identify end user 12. For example, some devices may wish to identify end user 12 for authorization or quality of service purposes. In another example, a device may wish to maintain user profiles to provide for accounting records (for example per-user accounting) or to provide for content billing operations. Alternatively, a device or a component may use an identification to provide for any other type of suitable client-aware service, tool, or feature according to the particular needs of network components or equipment. Additional services may be related to areas such as routing, accounting, firewalling, filtering, or any other suitable parameters or policies where user-aware characteristics serve as a basis for service implementation.

CSPG 32 represents a generic piece of network equipment that may benefit from secondary PDP awareness. CSPG 32 could be a wireless application protocol (WAP) gateway, a compression and/or optimization engine, a billing engine (inclusive of per-content billing), a service enforcement element, a content authorization component, a policy enforcement gateway, or any other element that is operable to modify, process, or transform data or information in a network environment. CSPG 32 represents any component, device, element or object that can benefit from having PDP awareness information.

In a particular embodiment of the present invention, CSPG 32 includes software that is operable to interface properly with GGSN 30 such that PDP awareness is achieved. Alternatively, this function may be provided by any suitable hardware, component, device, application specific integrated circuit (ASIC), processor, algorithm, element or object that is operable to achieve such awareness. CSPG 32 may suitably process and/or maintain incoming traffic pattern information in any appropriate manner. For example, such information may be kept in a database, a queue, or a table, which is described in greater detail below with reference to FIG. 2. Alternatively, such information may be provided in any suitable random access memory (RAM), read only memory (ROM), erasable programmable ROM (EPROM), electronically erasable ROM (EEPROM), or in any other suitable component, device, element or object where appropriate and based on particular needs.

As described above, CSPG 32 utilizes the identity of the client or the end user to provide services based on a source profile. In a particular embodiment of the present invention, CSPG 32 provides client-aware services by operating at networking layers two and three. Accordingly, the information available at networking layers two and three provides a basis for the identification of an end user or a client. CSPG 32 may use an IP address or any other suitable parameter to uniquely identify a client or an end user in offering a service, enhanced capability, or feature to an end user. CSPG 32 may include any suitable hardware, software, components, or elements that identify a unique identifier in order to provide some networking feature or capability to an end user.

FIG. 2 is a simplified block diagram illustrating a table 40 included within CSPG 32 in an example implementation of communication system 10. Table 40 may be created and stored within or external to CSPG 32. Table 40 may include traffic pattern information for any given end user's IP address, profile, or policy. As illustrated by FIG. 2, table 40 could include (and be indexed by) GGSN number, number of PDPs, policy/profile, source IP address, destination IP address, protocol, IP address of end user 12, source and destination ports, or quality of service characteristics. These elements may be used to differentiate quality of services or to implement different policies for handling corresponding traffic. Thus, from a given end user's IP address, its traffic can be mapped to a particular policy on a per-flow (per-PDP) basis to achieve enhanced granularity.

Entries within table 40 may be cleaned up, deleted, or updated periodically (or alternatively updated or changed based on some event or modification to system parameters) in order to accurately reflect one or more source profiles associated with one or more end users. For example, entries could be entered when a PDP is created, removed when a PDP is torn down, and updated in response to any material change in the PDP. Entries could also be deleted specifically or deleted per communications flow or per PDP. In the case of RADIUS messaging, the population of the table may be controlled by RADIUS accounting messages or by any other suitable populating protocol according to particular needs.

In operation, CSPG 32 can match a source IP address with a user profile. This may be accomplished in a variety of ways. For example, upon receipt of a request packet from a client or an end user, CSPG 32 may query or access table 40 for pertinent traffic pattern information. By evaluating the RADIUS packets flowing within communication system 10, CSPG 32 may learn information about an end user, source, or client based on the RADIUS packet propagation. For example, Access Requests, Access Accepts, Accounting Requests, and Accounting Acknowledgments may include information that CSPG 32 may use in identifying traffic pattern information associated with an end user or source.

FIG. 3 is a simplified schematic diagram illustrating a series of example steps associated with a method for relaying traffic pattern information in a network environment. The method begins at step A where end user 12 may access a network and open a primary PDP context (potentially having a certain set of parameters or vectors that describe quality of service, security, etc.). Thus, end user 12 brings up a primary PDP context via SGSN 18 to GGSN 30. The primary PDP context may be a GPRS data call coming from a GPRS-enabled GSM mobile station. The establishment of the primary PDP may be done, for example, based on the configured access point name (APN) through its assigned SGSN 18. SGSN 18 may then identify the proper GGSN to which to direct this traffic and set up a GTP tunnel. Once the primary PDP has been established, the end user or mobile station may elect to create a secondary PDP having an alternative QoS at step B. The mobile station may send a secondary PDP create request through the GTP tunnel. The secondary create request may specify the traffic that will flow through the secondary PDP and, further, that such traffic should receive a designated quality of service.

GGSN 30 may then relay traffic pattern information associated with the secondary PDP to CSPG 32 at step C. CSPG 32 may store such information in any appropriate location: for example in table 40. CSPG 32 may now perform adequate client-aware services in providing capabilities or tools to end user 12 on a per-PDP basis. This may be achieved by accessing table 40.

At step D, end user 12 may re-negotiate the quality of service for a given PDP. Once GGSN 30 becomes aware of this change, an update may be sent by GGSN 30 to other service elements indicating that the traffic flow has changed for that PDP at step E. Table 40 may also be updated to account for such a change. Once GGSN 30 elects to tear down a given PDP at step F. This information can also be reflected by table 40 and relayed to other service elements in the network at step G.

Note that the example of FIG. 3 has been offered for purposes of teaching only. Accordingly, some of these steps may be changed, deleted, or replaced with other steps where appropriate. Such modifications may be based on particular communication needs or specific communication architectures and configurations and are within the teachings of the present invention.

Although the present invention has been described in detail with reference to particular embodiments, it should be understood that various other changes, substitutions, and alterations may be made hereto without departing from the spirit and scope of the present invention. For example, although the present invention has been described as operating in PDSN or GGSN environments, the present invention may be used in any networking environment that routes or processes information based on the identity of an end user 12. The awareness protocol disclosed in the preceding figures is generally applicable to all communication systems in which information packets are routed between or through IP networks.

Note also that although specific protocols are described herein in this document to illustrate example operations, any suitable communicative platforms may be used to effectuate the operations, which provide an awareness for communication system 10. GGSN 30 may relay a traffic pattern specified to the network elements beyond GGSN 30 via any suitable backend control protocol (e.g. GTP', RADIUS, DIAMETER, terminal access controller access system (TACACS), etc.). Additionally, the traffic flow template as described above does not have to be associated with GPRS Version 1.0 and may instead be related to any GPRS version and/or any type of data that specifies traffic pattern information for end user 12.

Numerous other changes, substitutions, variations, alterations, and modifications may be ascertained to one skilled in the art and it is intended that the present invention encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this invention in any way that is not otherwise reflected in the appended claims.

What is claimed is:

1. An apparatus for relaying information in a network environment, comprising:
   a gateway general packet radio service (GPRS) support node (GGSN) operable to:
   establish primary and secondary packet data protocol (PDP) links on behalf of an end user; and
   communicate traffic pattern information associated with the primary and secondary PDP links to a client services packet gateway (CSPG) through one or more control path interfaces of the GGSN to the CSPG by adding the traffic pattern information into traffic flows communicated through the one or more control path interfaces of the GGSN to the CSPG, the CSPG being external to and upstream from the GGSN, the traffic pattern information:
   providing data associated with how traffic flows propagating via each of the primary and secondary PDP links are to be treated in a information network;
   specifying a first quality of service level for the primary PDP link and a different second quality of service level for the secondary PDP link; and
   allowing the CSPG to provide at least one service according to one or more appropriate quality of service levels determined from the traffic pattern information, the CSPG operable to parse the traffic pattern information to determine the first quality of service level for the traffic flows propagating via the primary PDP link and the second quality of service level for the traffic flows propagating via the secondary PDP link.

2. The apparatus of claim 1, wherein the traffic pattern information is provided in a selected one of a group of protocols that consists of:
   a) a RADIUS protocol;
   b) a TACACS protocol;

c) a GTP' protocol; and
d) a DIAMETER protocol.

3. The apparatus of claim 1, wherein the CSPG is operable to provide one or more services to the end user, the services being selected from a group of services consisting of:
   a) accounting;
   b) firewalling;
   c) filtering;
   d) wireless application protocol transformations;
   e) compression;
   f) optimization;
   g) billing; and
   h) content authorization.

4. The apparatus of claim 1, wherein the traffic pattern information includes information relating to a selected one or more elements consisting of:
   a) a source IP address;
   b) a destination IP address;
   c) a source port;
   d) a destination port;
   e) a service profile associated with the end user;
   f) a quality of service parameter;
   g) an IP address associated with the end user;
   h) a protocol type;
   i) a service policy associated with the end user;
   j) data related to the primary PDP link; and
   k) data related to the secondary PDP link.

5. The apparatus of claim 1, further comprising a table included within the CSPG that is operable to store the traffic pattern information such that it may be referenced by the CSPG to provide a selected quality of service for a selected one of the primary and secondary PDP links.

6. An apparatus for receiving information in a network environment, comprising:
   a client services packet gateway (CSPG) operable to:
      receive traffic pattern information from a gateway general packet radio service (GPRS) support node (GGSN), the GGSN being operable to establish primary and secondary packet data protocol (PDP) links on behalf of an end user and to communicate the traffic pattern information associated with the primary and secondary PDP links to the CSPG through one or more control path interfaces of the GGSN to the CSPG by adding the traffic pattern information into traffic flows communicated through the one or more control path interfaces of the GGSN to the CSPG, the CSPG being external to and upstream from the GGSN, the traffic pattern information:
         provides providing data associated with how traffic flows propagating via each of the primary and secondary PDP links are to be treated in a network;
         specifying a first quality of service level for the primary PDP link and a different second quality of service level for the secondary PDP link; and
         allowing the CSPG to provide at least one associated service according to one or more appropriate quality of service levels determined from the traffic pattern information; and
      parse the traffic pattern information to determine the first quality of service level for the traffic flows propagating via the primary PDP link and the second quality of service level for the traffic flows propagating via the secondary PDP link providing an associated service according to the appropriate quality of service level as determined from the traffic pattern information.

7. The apparatus of claim 6, wherein the traffic pattern information is provided in a selected one of a group of protocols that consists of:
   a) a RADIUS protocol;
   b) a TACACS protocol;
   c) a GTP' protocol; and
   d) a DIAMETER protocol.

8. The apparatus of claim 6, wherein the CSPG is operable to provide one or more services to the end user, the services being selected from a group of services consisting of:
   a) accounting;
   b) firewalling;
   c) filtering;
   d) wireless application protocol transformations;
   e) compression;
   f) optimization;
   g) billing; and
   h) content authorization.

9. The apparatus of claim 6, wherein the traffic pattern information includes information relating to a selected one or more elements consisting of:
   a) a source IP address;
   b) a destination IP address;
   c) a source port;
   d) a destination port;
   e) a service profile associated with the end user;
   f) a quality of service parameter;
   g) an IP address associated with the end user;
   h) a protocol type;
   i) a service policy associated with the end user;
   j) data related to the primary PDP link; and
   k) data related to the secondary PDP link.

10. The apparatus of claim 6, further comprising a table included within the CSPG that is operable to store the traffic pattern information such that it may be referenced by the CSPG to provide a selected quality of service for a selected one of the primary and secondary PDP links.

11. A method for relaying information in a network environment, comprising:
   establishing primary and secondary packet data protocol (PDP) links on behalf of an end user; and
   communicating traffic pattern information associated with the primary and secondary PDP links to a client services packet gateway (CSPG) through one or more control path interfaces of a gateway general packet radio service (GPRS) support node (GGSN) to the CSPG by adding the traffic pattern information into traffic flows communicated through the one or more control path interfaces of the GGSN to the CSPG, the CSPG being external to and upstream from the GGSN, the traffic pattern information:
      providing data associated with how traffic flows propagating via each of the primary and secondary PDP links are to be treated in a network;
      specifying a first quality of service level for the primary PDP link and a different second quality of service level for the secondary PDP link; and
      allowing the CSPG to provide at least one service according to one or more appropriate quality of service levels determined from the traffic pattern information, the CSPG operable to parse the traffic pattern information to determine the first quality of service level for the traffic flows propagating via the primary PDP link and the second quality of service level for the traffic flows propagating via the secondary PDP link.

12. The method of claim 11, further comprising:
leveraging a communications protocol in order to deliver the traffic pattern information, wherein the traffic pattern information is provided in a selected one of a group of protocols that consists of:
a) a RADIUS protocol;
b) a TACACS protocol;
c) a GTP' protocol; and
d) a DIAMETER protocol.
13. The method of claim 11, further comprising:
providing a table within the CSPG; and
storing the traffic pattern information such that it may be referenced by the CSPG to provide a selected quality of service for a selected one of the primary and secondary PDP links.
14. A system for relaying information in a network environment, comprising:
means for establishing primary and secondary packet data protocol (PDP) links on behalf of an end user; and
means for communicating traffic pattern information associated with the primary and secondary PDP to a client services packet gateway (CSPG) through one or more control path interfaces of a gateway general packet radio service (GPRS) support node (GGSN) to the CSPG by adding the traffic pattern information into traffic flows communicated through the one or more control path interfaces of the GGSN to the CSPG, the CSPG being external to and upstream from the GGSN, the traffic pattern information:
providing data associated with how traffic flows propagating via each of the primary and secondary PDP links are to be treated in a network;
specifying a first quality of service level for the primary PDP link and a different second quality of service level for the secondary PDP link; and
allowing the CSPG to provide at least one service according to one or more appropriate quality of service level as levels determined from the traffic pattern information, the CSPG operable to parse the traffic pattern information to determine the first quality of service level for the traffic flows propagating via the primary PDP link and the second quality of service level for the traffic flows propagating via the secondary PDP link.
15. The system of claim 14, further comprising:
means for leveraging a communications protocol in order to deliver the traffic pattern information.
16. The system of claim 14, further comprising:
means for receiving the traffic pattern information and providing a service based on the traffic pattern information received.
17. The system of claim 14, further comprising means for storing the traffic pattern information such that it may be referenced by the CSPG to provide a selected quality of service for a selected one of the primary and secondary PDP links.
18. A computer-readable medium comprising software for relaying information in a network environment, the software when executed operable to:
establish primary and secondary packet data protocol (PDP) links on behalf of an end user; and
communicate traffic pattern information associated with the primary and secondary PDP to a client services packet gateway (CSPG) through one or more control path interfaces of a gateway general packet radio service (GPRS) support node (GGSN) to the CSPG by adding the traffic pattern information into traffic flows communicated through the one or more control path interfaces of the GGSN to the CSPG, the CSPG being external to and upstream from the GGSN, the traffic pattern information:
providing data associated with how traffic flows propagating via each of the primary and secondary PDP links are to be treated in a network;
specifying a first quality of service level for the primary PDP link and a different second quality of service level for the secondary PDP link; and
allowing the CSPG to provide at least one service according to one or more appropriate quality of service levels determined from the traffic pattern information, the CSPG operable to parse the traffic pattern information to determine the first quality of service level for the traffic flows propagating via the primary PDP link and the second quality of service level for the traffic flows propagating via the secondary PDP link.
19. The computer-readable medium of claim 18, wherein the software is further operable to:
leverage a communications protocol in order to deliver the traffic pattern information.
20. The computer-readable medium of claim 18, wherein the software is further operable to:
receive the traffic pattern information and providing a service based on the traffic pattern information received.
21. The computer-readable medium of claim 18, further operable to store the traffic pattern information such that it may be referenced by the CSPG to provide a selected quality of service for a selected one of the primary and secondary PDP links.

* * * * *

UNITED STATES PATENT AND TRADEMARK OFFICE
CERTIFICATE OF CORRECTION

| | | |
|---|---|---|
| PATENT NO. | : 7,756,040 B1 | Page 1 of 1 |
| APPLICATION NO. | : 10/680957 | |
| DATED | : July 13, 2010 | |
| INVENTOR(S) | : Laurent H. Andriantsiferana et al. | |

It is certified that error appears in the above-identified patent and that said Letters Patent is hereby corrected as shown below:

Col. 8, Ln. 50: After "treated in a" delete "information".

Signed and Sealed this

Fifth Day of October, 2010

David J. Kappos
*Director of the United States Patent and Trademark Office*